United States Patent
Iordanov

(10) Patent No.: US 9,507,607 B2
(45) Date of Patent: Nov. 29, 2016

(54) VIRTUAL PERSISTENCE

(71) Applicant: VMware, Inc., Palo Alto, CA (US)

(72) Inventor: Doichin Iordanov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 569 days.

(21) Appl. No.: 13/891,549

(22) Filed: May 10, 2013

(65) Prior Publication Data
US 2014/0337276 A1 Nov. 13, 2014

(51) Int. Cl.
*G06F 17/30* (2006.01)
*G06F 9/44* (2006.01)

(52) U.S. Cl.
CPC ....... *G06F 9/4435* (2013.01); *G06F 17/30371* (2013.01); *G06F 17/30091* (2013.01); *G06F 17/30162* (2013.01); *G06F 17/30575* (2013.01)

(58) Field of Classification Search
CPC .................. G06F 17/30156; G06F 17/30371; G06F 17/30557; G06F 3/0631; G06F 17/30085; G06F 9/4435
USPC ....... 707/602, 610, 618, 690, 692, 754, 756, 707/758, 803
See application file for complete search history.

(56) References Cited

U.S. PATENT DOCUMENTS

| | | | |
|---|---|---|---|
| 8,321,438 B1 * | 11/2012 | Smith | G06F 17/30592 707/758 |
| 8,402,004 B2 * | 3/2013 | Provenzano | G06F 17/30162 707/692 |
| 8,560,693 B1 * | 10/2013 | Wang | H04L 12/4625 709/201 |
| 8,688,650 B2 * | 4/2014 | Mutalik | G06F 17/30162 707/690 |
| 8,966,191 B2 * | 2/2015 | Flynn | G06F 3/061 711/154 |
| 2008/0189240 A1 * | 8/2008 | Mullins | G06F 17/30557 707/999.002 |
| 2009/0204583 A1 * | 8/2009 | Hechler | G06F 17/3056 707/999.001 |
| 2011/0087709 A1 * | 4/2011 | Sriram | G06F 17/30371 707/803 |
| 2012/0123999 A1 * | 5/2012 | Ashutosh | G06F 11/1453 707/618 |
| 2014/0068183 A1 * | 3/2014 | Joshi | G06F 3/0659 711/114 |
| 2014/0130055 A1 * | 5/2014 | Guha | G06F 3/0604 718/104 |
| 2014/0172888 A1 * | 6/2014 | Odenheimer | G06F 17/30557 707/756 |

* cited by examiner

*Primary Examiner* — Dangelino Gortayo

(57) ABSTRACT

A virtual persistence platform is described that provides requirement-driven persistence store orchestration. Application developers can annotate program code with persistence properties and requirements, and a compiler component of the virtual persistence platform generates a persistence service level agreement (PSLA) that becomes attached to the application. After deployment and launch, the virtual persistence platform uses the PSLA to handle persistence commands from the application and perform persistence store orchestration.

27 Claims, 7 Drawing Sheets

VIRTUAL PERSISTENCE

BACKGROUND

"Persistence" in computing generally describes a characteristic of state (i.e., data) that outlives the process that created it. For example, developers use persistence systems to store data representing a state of an application and other information using an underlying storage system, such as a database system. Persistence architectures have evolved and become more complex due to increasing requirements for scalability. The increased scalability requirements, as well as the rise in variety of data usage patterns, have lead to constraints that may not be solved by using a single database system. This has lead to an explosion of different persistence solutions now available to developers, each having dozens of application programming interfaces and properties. Developers are required to possess a wide range of database skills and languages (i.e., polyglot) in order to be able to cope with modern application persistence. Even knowledge of various databases, frameworks, and APIs may not be enough, developers have to earn experience before being able to apply the right tools for an application's persistence requirements (e.g., highly available vs. highly consistent persistence).

SUMMARY

One or more embodiments of the present disclosure provide a virtual persistence platform uses persistence requirements to orchestrate execution of persistence commands among a wide variety of types of persistence stores. The virtual persistence platform uses a high level virtual persistence application programming interface (API) that does not expose specifics of the underlying database, or persistence store, such as tables, cache regions, or key-value pairs. Rather, the virtual persistence platform operates with object-oriented constructs supported by many applications: the object entity. The developer may specify persistence requirements and properties and delegate the virtual persistence platform to persist object entities and retrieve query data according to these requirements.

One or more embodiments disclosed herein provide a method, computer program product, and computer system for providing a persistence layer to an application. In one embodiment, the method includes receiving, from an application, a persistence command for an entity of the application and retrieving metadata associated with the entity. The metadata specifies a set of persistence requirements associated with the entity and an entry point to a virtual instruction associated with the received persistence command. The method further includes selecting a persistence store from a plurality of candidate persistence stores, based on the set of persistence requirements associated with the entity. The method includes linking the virtual instruction to an instruction processor specific to the selected persistence store, and executing the received persistence command using the linked instruction processor specific to the selected persistence store.

BRIEF DESCRIPTION OF THE DRAWINGS

So that the manner in which the above recited aspects are attained and can be understood in detail, a more particular description of embodiments of the present disclosure, briefly summarized above, may be had by reference to the appended drawings.

DETAILED DESCRIPTION

Figure 1:
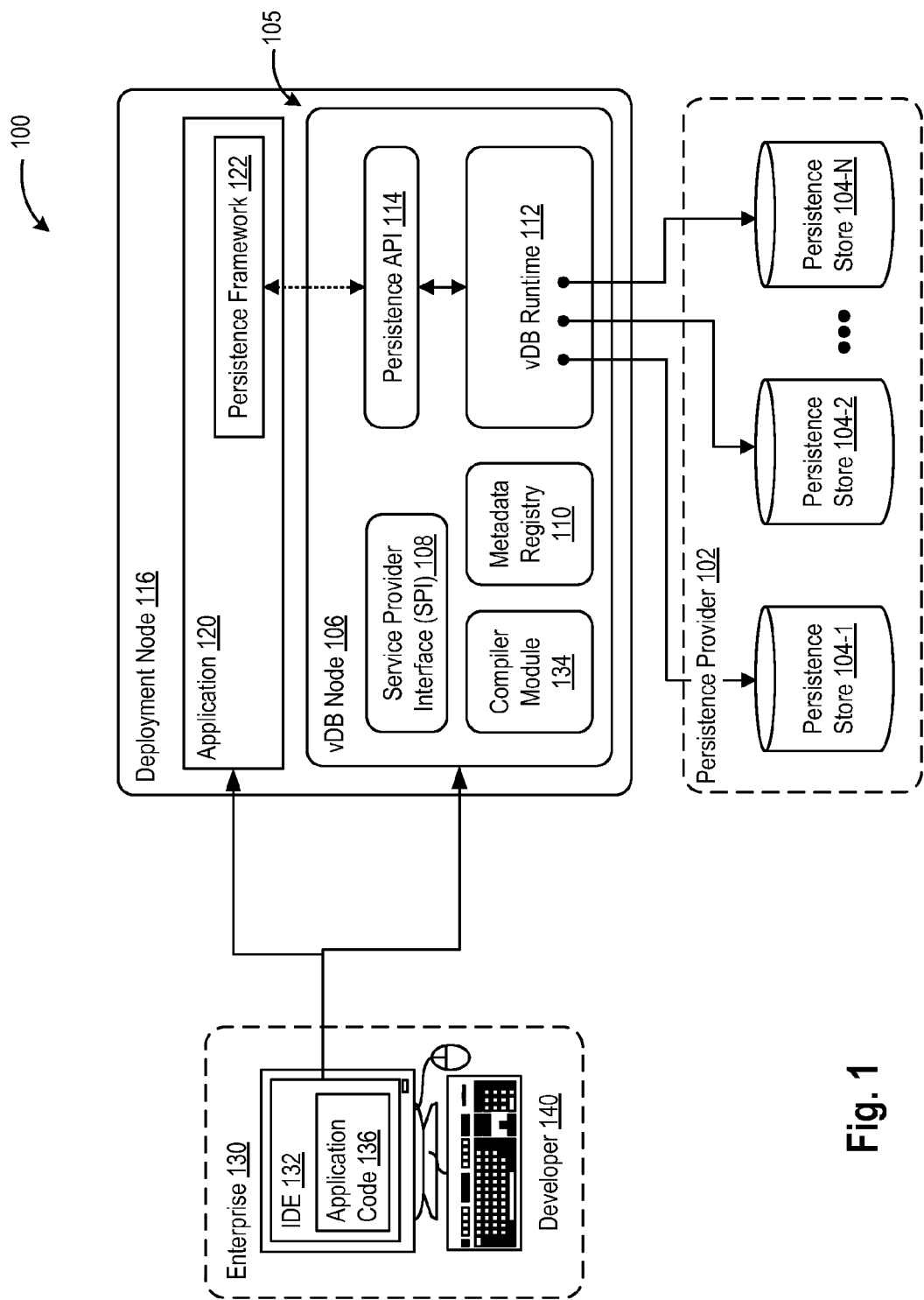
FIG. 1 is a block diagram that illustrates a computing system with which one or more embodiments of the present disclosure may be utilized.

FIG. 1 is a block diagram that depicts one embodiment of a computing system 100 providing a virtual persistence layer for persistence providers. An enterprise 130 seeks to develop an application that utilizes a persistence architecture provided by persistence provider 102. For example, persistence provider 102 may provide access (e.g., via a REST (Representational State Transfer) APIs or any other client-server communication protocol) to a variety of persistence stores (i.e., 104-1, 104-2, 104-N, collective referred to as stores 104) such as relational database management systems (RDBMS), non-relational "big-table" distributed databases (e.g., HBase, Hypertable), document-oriented stores (e.g., MongoDB), key-value stores (e.g., Cassandra, Redis), graph databases (e.g., InfiniteGraph), and other "NoSQL"-style database systems that enterprise 130 desires to utilize as persistence for its developed application.

Computing system 100 includes a virtual persistence platform 105 to act as a persistence interface which abstracts the variety of APIs of persistence stores 104 and reduces persistence complexity. Virtual persistence platform 105 includes one or more virtual database (vDB) nodes 106 configured to translate high-level persistence commands (e.g., update entity, retrieve entity) received from an application and, as further detailed below, orchestrate execution of the persistence commands with different types of persistence stores based on persistence requirements defined for the requesting application. In one embodiment, vDB node 106 may be a packaged library (e.g., Java Archive, or JAR, file) having a plurality of sub-components, including a compiler module 134, metadata registry 110, vDB runtime 112, and one or more interfaces, such as a service provider interface (SPI) 108, and persistence API 114.

In the embodiment depicted in FIG. 1, applications, such as application 120, may be developed by a developer 140 in enterprise 130 using an integrated development environment (IDE) 132 installed on the developer's laptop or terminal. Developer 140 writes application code 136 that invokes a persistence API 114 of vDB node 106 when calling persistence-related commands. In some embodiments where the application utilizes an object-relational mapping (ORM) that defines relationships between code objects and persistence objects, the object-relational mapping (depicted in FIG. 1 as persistence framework 122) may be extended to invoke persistence API 114. Examples of such persistence frameworks that may be used by an application include Java Data Objects (JDO) EntityManager and Java Persistence API (JPA) PersistenceManager (a JDO example of which is shown later in Table 1), and Spring Data. Developer 140 further writes application code 136 that specifies persistence requirements for the application, such as persistence requirements regarding consistency, availability, partition tolerance, volume, scale, etc.

In one embodiment, during development, vDB node 106 may be a packaged library located at the developer's terminal. Developer 140 may include vDB node 106 within an application project for application 120 with a build dependency and a runtime dependency. The build, or compile, dependency associates the application with compiler module 134 that is configured to parse persistence requirements specified within the application code and generate persistence service level agreements (PSLAs) for entities or queries defined within the application code. When compiling application 120, compiler module 134 packages the PSLAs (and other artifacts described later) into a persistence contract associated with application 120. For example, persistent contracts may be serialized in a designated folder of the developer's application project as a set of object files (e.g., Java class files) and manifest file(s).

In one embodiment, application 120 specifies a runtime dependency with vDB node 106 that associates application 120 with a vDB runtime 112 which is configured to handle persistence-related commands issued by application 120 through persistence framework 122 and orchestrate persistence stores 104 in order to persist entities and retrieve query data according to PSLAs corresponding to the commands.

Metadata registry 110 maintains system information including persistence contracts having persistence requirements of entities or queries (as embodied by an entity or query PSLA). In one embodiment, metadata registry 110 contains information from registered stores. Persistence stores 104 may be registered in metadata registry 110 using SPI 108. Each persistence store 104 is registered along with a PSLA describing the store's persistence capabilities, connection parameters, and runtime placeholders (e.g., password). In one implementation, metadata registry 110 may use vDB runtime 112 to store its state as a set of system entities. In one embodiment, metadata registry 110 may store execution-related information such as cached PSLA instruction plans, and runtime and data usage statistics for fine tuning PSLAs and streamlining data flow.

In one example implementation, during deployment of application 120, IDE 132 may package the application, including the persistence contracts and the application files into an application archive, package, bundle, or other runtime. In embodiments where the application specifies a runtime dependency on vDB node 106, the vDB node 106 including vDB runtime 112 is included within the application archive as well. Developer 140 deploys the application archive into a deployment node 116 configured to execute the application archive, for example, in a runtime environment (e.g., Java Virtual Machine), or an operating system. The deployment node 116 unpacks the application archive and launches the application 120. The deployment node 116 loads application runtime dependencies, which includes vDB runtime 112, thereby starting instances of vDB runtime 112 and metadata registry 110. Metadata registry 110 loads entity and PSLA manifest artifacts from the unpacked application files (e.g., via a bootstrap script). During operation, deployment node 116 (e.g., via a runtime environment) executes application 120, and persistence commands issued by the application are routed through persistence framework 122 to vDB runtime 112. In one embodiment, persistence stores 104 may be registered by persistence provider 102 (e.g., via SPI 108) within metadata registry 110 to capture well-known store types (e.g., OLTP, OLAP) and associated pre-determined persistence requirements. For example, persistence provider 102 may register a Postgres store with known capabilities of excellent consistency, but a lack of scalability.

While embodiments of the present disclosure depict one particular embodiment of virtual persistence platform 105 as deployed on a same deployment node 116 as the application(s) which the vDB node serves, it should be recognized that other suitable architectures and deployment models are well within the scope of the present disclosure. For example, virtual persistence platform 105 and vDB nodes 106 may be executing as one or more virtual machines (VMs). In another example, virtual persistence platform 105 may have a flexible deployment model for both stand-alone and distributed use cases. In one embodiment having a distributed architecture, there may be a plurality of vDB nodes 106 and may communicate through their corresponding metadata registries, which read and write system information through vDB runtimes in distributed stores for partition-tolerance OLTP SLAs. In another embodiment, vDB node 106 may be deployed on as a stand-alone entity. Other example architectures include a server-side vDB or peer-to-peer vDB nodes.

Persistence Contract Compilation

Figure 2:
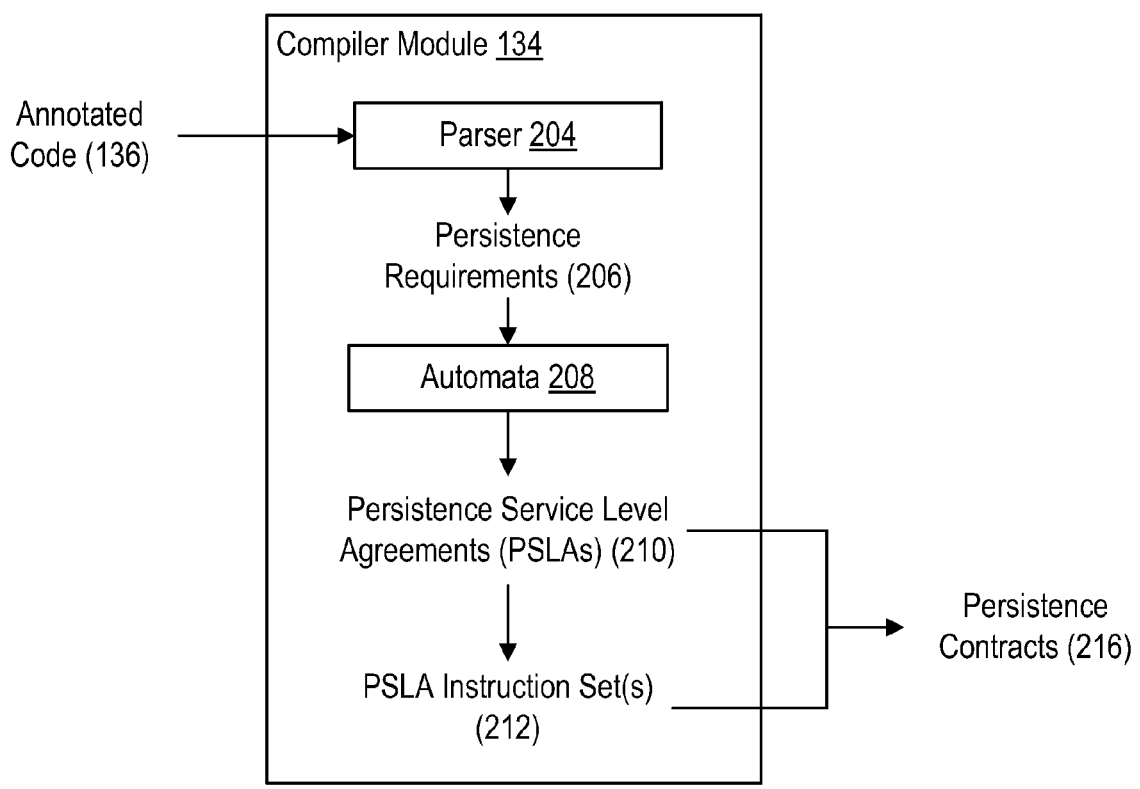
FIG. 2 is a block diagram illustrating the compiler module of FIG. 1 in greater detail.

FIG. 2 depicts in greater detail compiler module 134 of FIG. 1, which is configured to parse persistence requirements specified by application code and generate persistence service level agreements (PSLAs). Compiler module 134 may be integrated with the main compilation process (e.g., performed by IDE 132) for an application project, and when an application project is compiled, compiler module 134 intercepts application code 136 during a post-processing phase.

As shown in FIG. 2, compiler module 134 uses one or more parsers 204 to parse annotated code 136 and recognize persistent requirements 206 as a set of persistence properties having invariants. For each identified subject, compiler module 134 generates a persistence service level agreement (PSLA) 210 based on the parsed persistence requirements 206. The determined persistence requirements are grouped by patterns, referred to as PSLAs 210. In the embodiment shown in FIG. 2, compiler module 134 uses persistence automata 208 to act as an expert system that determines a PSLA 210 based on the explicit persistence requirements 206 and other information from annotated code 136. Automata 208 may recognize data usage patterns, apply persistence property dependencies, infer default values for missing requirements, and validate explicit persistence requirements. For each generated PSLA 210, compiler module 134 generates a PSLA instruction set 212, which constitutes a plan for enforcing the respective PSLA during persistence and retrieval operations. The artifacts of compilations, including subjects, PSLAs 210, PSLA instruction sets 212, dependencies, etc., are packaged into a persistence contract 216.

In one embodiment, application code 136 may specify one or more entities which are persistence domain objects. By way of example, in cases where the persistence store used is a relational database, an entity may represent a table in the relational database, and an entity instance may correspond to a row in that table. In one implementation, the programming artifact of an entity within application code 136 is an entity class. In one embodiment, application code 136 may include code annotations that explicitly define persistence requirements for entities and queries. In one particular implementation, a developer may extend object-relational mapping annotations, which map entities and entity relationships to data in an underlying persistence store, to specify persistence requirements for entities and entity relationships. An example of annotated application code 136 is shown in Table 1, thought it should be recognized that any style or syntax of code annotations may be used according to the techniques described herein. It should be further recognized that, in an alternative embodiment, rather than use code annotations, persistence requirements may be specified in a separate descriptor file (e.g., XML metadata file) associated with application code 136.

TABLE 1

Example code annotations for persistence properties

```
@PersistenceCapable
@Extensions({
    @Extension(vendorName = "vdb", key="volume", value="L"),
    @Extension(vendorName = "vdb", key "partition", value="true")
})
@Queries( {
    @Query(name="VcdOrgById",
        value="SELECT UNIQUE FROM vdb.example.org.VcdOrg
WHERE id==vcd_org_id PARAMETERS long vcd_org_id",
        extensions={ @Extension( vendorName="vdb", key="volume",
value="S") }),
    @Query(name="VcdOrgCountByRegion",
        value="SELECT region, COUNT(id), FROM
vdb.example.org.VcdOrg GROUP BY region",
        extensions={
            @Extension(vendorName="vdb", key="volume", value="L"),
            @Extension(vendorName="vdb", key="latency", value=
            "2min") })
})
public class VcdOrg {
    @PrimaryKey
    @Persistent
    public Long getId( ) { return id; }
    @Persistent
    public Long getName ( ) { return name; }
    @Persistent
    public Long getRegion ( ) { return region; }
    public void setId(Long id)( { this.id = id; }
    public void setName(String name) { this.name = name; }
    public void setRegion(String region) { this.region = region; }
    private Long id;
    private String name;
    private String region;
}
```

Table 1 shows example application code for an entity representing an organization VcdOrg and queries associated with the entity, including a first query VcdOrgById that loads an entity instance by a supplied ID, and an analytical query VcdOrgCountByRegion that returns the count of organizations by region. In the example shown, the developer has used code annotations to explicitly define persistence requirements for the VcdOrg entity itself that indicate a large volume of processed data (i.e., volume="L") and partition tolerance (i.e., partition="true"); persistence requirement for the VcdOrgById query that indicates a small volume of processed data (i.e., volume="S"); and persistence requirements for the VcdOrgCountByRegion query that indicates a large volume of processed data (i.e., volume="L") and a permissible latency of 2 minutes for OLTP changes to propagate to the query results (i.e., latency="2 min").

Compiler module 134 may further recognize various subjects with annotated code 136 and group persistence properties around the recognized subjects. A "subject" is a developer construct that represents a subject of a persistence or retrieval operations (e.g., entity or query). Using the example shown in Table 1, a subject could be the entity VcdOrg itself, or could be the queries VcdOrgById and VcdOrgCountByRegion.

According to one embodiment, persistence requirements for an application may be defined explicitly, implicitly, or dynamically. Persistence requirements may be defined explicitly using virtual persistence language for PSLA definition (e.g., in code annotations shown above). Persistent requirements may also be defined implicitly based on an analysis of the class interfaces for an entity and query or their usage within the application code which can infer certain persistence qualities. In one example, analysis of the persistence annotation:

@Query(name="VcdOrgCountByRegion",
value="SELECT region, COUNT(id), FROM vdb.example.org.VcdOrg GROUP BY region"

can infer an OLAP pattern due to the use of the aggregate functions GROUP and COUNT. In another example, an analysis of a class interface of an entity can reveal a lack of mutator methods, which can infer an immutable persistence, and hence stronger consistency.

As mentioned above, compiler module 134 uses automata 208 to act as an expert system that recognizes data usage patterns in the formed PSLAs 210, including such patterns as online transaction processing (OLTP), online analytics processing (OLAP), and patterns that fall within this continuum; distributed variants of these patterns according to the scope (e.g., local, LAN, WAN); and functional patterns such as loosely-defined schema traversal (e.g., using xQuery) or time-series progressive aggregation. In one embodiment, automata 208 resolves conflicting patterns (e.g., OLTP vs. OLAP) using a configurable PSLA conflict resolution strategy, which can narrow existing PSLA property invariants, add new instructions, and/or chain instructions. For example, to enable a heavy OLAP query over an OLTP query, an OLTP-OLAP conflict resolution strategy inserts an ETL (i.e., Extract-Transform-Load) instruction on the analytical query PSLA plan and a Log instruction in the entity OLTP PSLA plan. This effectively offloads the entity OLTP store from the OLAP load by replicating its data to an OLAP replica.

Figure 3:
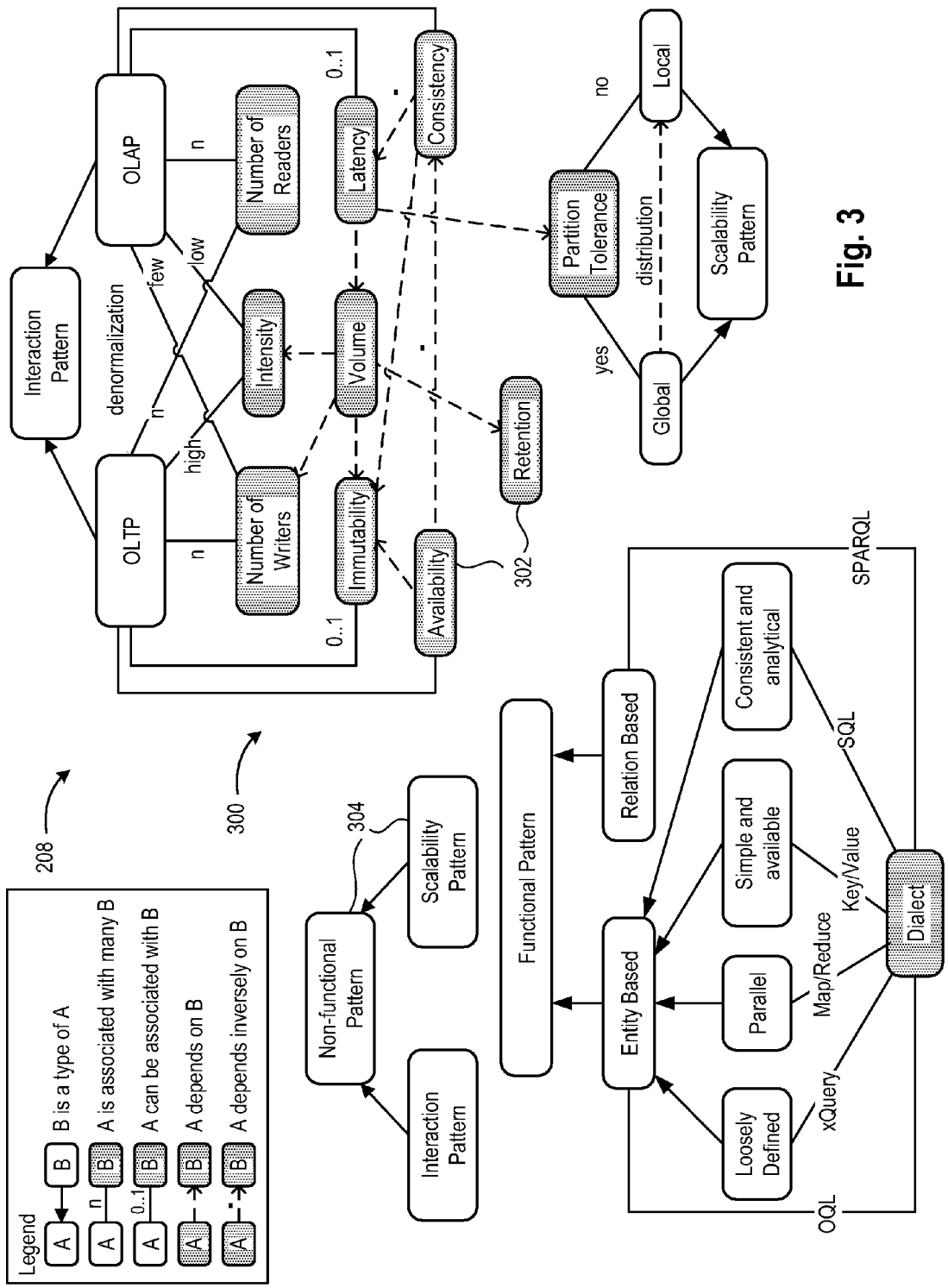
FIG. 3 depicts an example of a persistence automata that may be used for requirement-driven persistence, according to one embodiment of the disclosure.

FIG. 3 depicts an example of persistence automata 208 that may be used for requirement-driven PSLA-based persistence. Persistence automata 208 includes an extensible persistence model 300 that can describe a wide variety of entity persistence use-cases, and an extendable state machine that operates on the model, recognizes database patterns, and knows how to combine the recognized database patterns, resolving conflicting requirements, if needed. In the embodiment depicted in FIG. 3, persistence model 300 is represented as a graph of gray nodes, representing properties and their relations, and state machine knowledge is represented as a graph of patterns, each associated with certain property invariants. Pattern dependencies depict the state machine knowledge for combining pattern. It should be recognized that the automata depicted in FIG. 3 is one specific example, and that other suitable automata and models implemented and used are within the scope of the present disclosure. For example, in another embodiment, persistence models that define persistence requirements for a query having no writers property, persistence requirements for transactions and indexing on an entity field, or models that define entity access control rules, are some examples of functional requirements that may be presented by new persistence properties extended from the persistence model.

As shown in FIG. 3, model 300 includes a plurality of persistence properties 302, such as a number of writers, number of readers, intensity, volume of processed data, consistency, availability, entity immutability, latency, data retention, consistency, partition tolerance, and dialect. Persistence properties 302 may be linked through relations, e.g., data volume is a function of the number of writers, write intensity, entity immutability, and data retention.

A persistence property (depicted as a shaded node 302) can describe an architectural persistence quality by specifying a range of value(s) that should hold true, referred to as property invariants. These value invariants provide a simplified representation of persistence characteristics that the virtual persistence platform can use to differentiate and compare entity persistence requirements with store capabilities. By associating a value invariant with a persistence property (e.g., "S" for volume, "true" for partition tolerance), model 300 may be used to describe capabilities of a persistence store 104 or persistent requirements of an entity/query. For example, the persistence property "latency" having the invariant "{5 sec, 10 sec}" indicates a developer requires that a given entity changes written to virtual persistence platform 105 to propagate in the entire persistence system with a latency of 5 to 10 seconds. In another example, to describe that an in-memory persistence store can store only small to medium amounts of data, the persistence store may specify the persistence property for "volume"={S, M}. In one embodiment, property invariants may specify a size dimension (i.e., S=small, M=medium, L=large) for properties such as number of writers, intensity, number of readers, etc.; true/false dimension for Boolean values, such as partition tolerance or immutability; a strength dimension (i.e., Strong, Eventual, Weak, None) for properties such as consistency, availability; and a dialect dimension for the function property "Language". In one embodiment, dialects may be categorized by their abstract level: high level dialects are store-agnostic (e.g., JDO and JPA); lower-level dialects are store-specific (e.g., SQL is for relational stores, or PL/SQL is for Oracle relational stores). Dialect dimensions may specify a high level dialect that can be translated to a lower level dialect (e.g., a JDO query can be translated to a PL/SQL statement or xQuery). It should be recognized that additional persistence properties, dimensions, or values may be added to cover persistence automata extensions and additional use cases. For example, a new "T-SQL" value may be added to the dialect dimension to cover MS SQL use cases.

In operation, in one embodiment, all persistence properties in model 300 may be assigned sentinel ranges. The state machine applies persistence requirements (as specified by developer) narrowing the relevant property invariants. The state machine applies property relations to deduct narrower invariants, validate requirements, and detect conflicting ones. The state machine is configured to recognize persistence patterns (depicted as nodes 304) out of the property invariants. For example, persistence requirements that indicate a high number of writes and a high number of simple reads (reads with low volume of data processing) may yield an OLTP pattern. Conflicted patterns may be resolved through persistence best-practices which are embodied in the state machine. For example, for a single entity, replication may be used to combine heavy OLAP requirements and intensive OLTP requirements, which typically may not co-reside due to contention for shared resources (e.g., locks and waits, undo segments, etc.), at the price of OLTP-to-OLAP change propagation latency.

Referring back to FIG. 2, compiler module 134 uses pre-configured requirement parsers 204 and pattern processors to determine PSLAs for the identified entities and queries within application code 136. Using the example entity shown in Table 1, automata 208 determines that since entity VcdOrg has mutator methods (e.g., set Id( ), setRegion( )), as well as an unspecified number of writers for the entity, the number-of-writers property has the invariant size dimension of {S,M,L}, which constitutes a classical OLTP pattern. As such, automata 208 identifies an OLTP PSLA to be associated with the entity VcdOrg.

According to one embodiment, a PSLA specifies a set of persistence properties with invariants that should hold. In the context of a persistence store, a PSLA associated with a store specifies the persistence capabilities of the persistence store. In the context of entities and queries defined in application code, a PSLA associated with an entity or query specifies persistence requirements requested by the developer. PSLAs 210 are configured to be comparable, such that PSLA A is said to be within PSLA B if for each property invariant of "A" (i.e., $P_A$-i), there is a corresponding property invariant in B (i.e., $P_B$-i) and the $P_A$-i value range is within the $P_B$-i value range. As such, a PSLA for a persistence store can be compared to a PSLA for an entity to determine if a given persistence store satisfies the PSLA for the entity or query.

Figure 4:
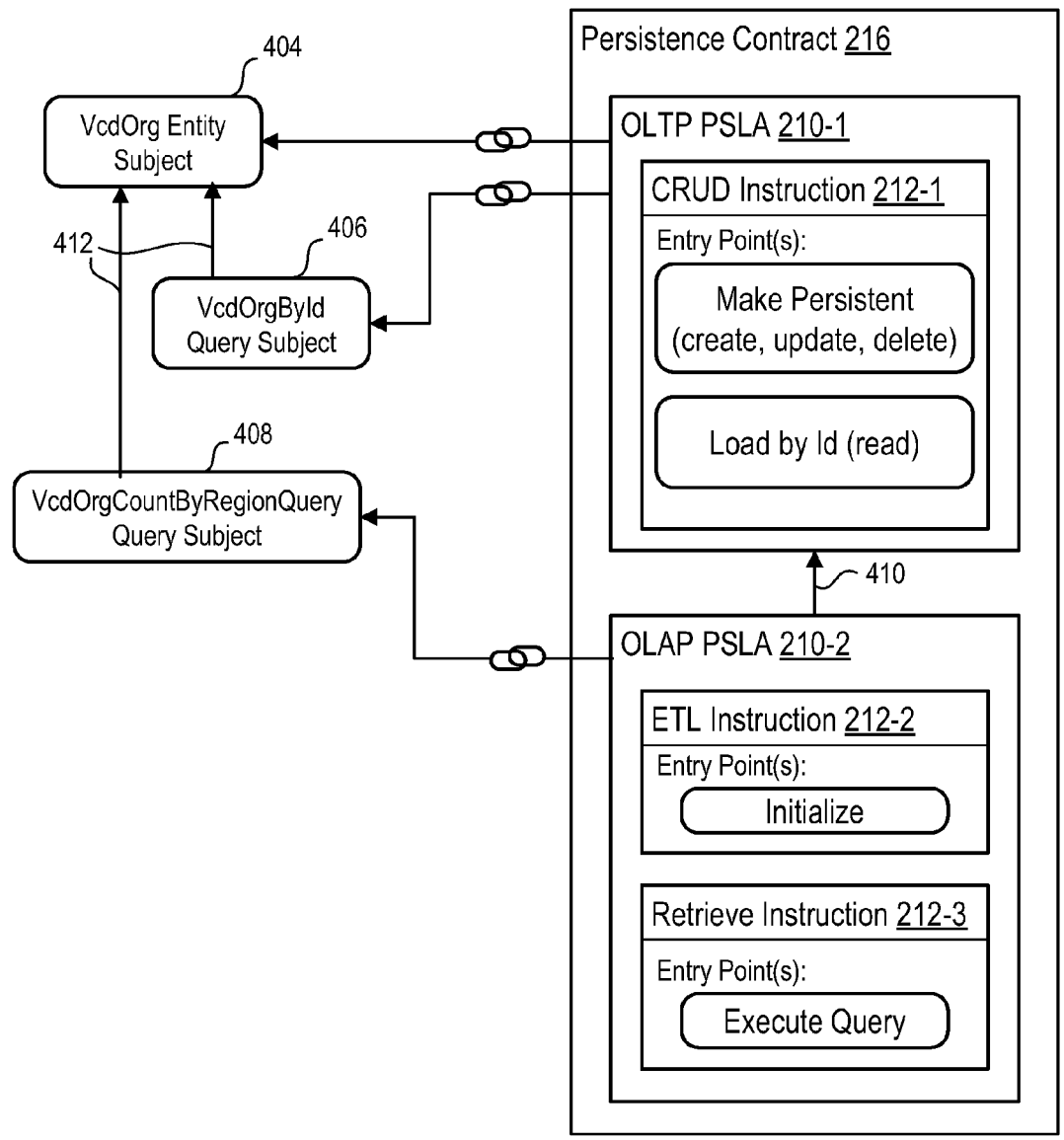
FIG. 4 depicts an example of a persistence contract having persistence service level agreements attached to an entity, according to one embodiment of the disclosure.

FIG. 4 depicts an example of persistence contract 216 having PSLAs 210-1, 210-2 associated with the VcdOrg entity shown in Table 1. In one embodiment, persistence contract 216 includes a plurality of PSLAs 210-1, 210-2 that are attached to one or more subjects to describe persistence requirements associated with the subjects. In one embodiment, each PSLA 210 includes subject information, where a subject represents the target of a persistence or retrieval operation, such as an entity or query. In one embodiment, each PSLA 210 includes a set of persistence properties with invariants that should hold and a set of PSLA instructions 212.

Continuing the example above, compiler module 134 generates an OLTP PSLA 210-1 which reflects the determined OLTP-type persistence requirements by composing the following persistence properties with invariants: writers<Size>{S,M,L}, readers<Size>{S,M,L}, volume <Size>{S, M}, and immutability<TrueFalse>{false}. Compiler 134 attaches OLTP PSLA 210-1 to the entity subject VcdOrg 404. Automata 208 processes the queries VcdOrgById and VcdOrgCountByRegion defined over the entity VcdOrg as two separate subjects 406, 408, which are linked to VcdOrg entity subject 404 (as depicted by arrows 412). The VcdOrgById persistence requirements are by analogy compiled into an OLTP query PSLA because the query fits within the entity OLTP PSLA without any conflicts. Meanwhile, the analytical query's requirement for high volumes of processed data imposes an OLAP PSLA 210-2. The generated OLAP PSLA 210-2 for the query VcdOrgCountByRegion inherits some persistence property invariants from the OLTP SLA 210-1 associated with the linked entity subject 404, such as partition<TrueFalse>{true}. Some invariants are set by the developer explicitly, such as volume<Size>{L}, and latency<Period>{2 min}, some invariants are specifically adapted by virtual persistence automata 208 to reflect the pre-defined OLAP pattern and Extract-Transform-Load (ETL) nature, such as writers <Size>{S}, readers<Size>{L}, intensity<Size>{L}, and immutability<TrueFalse>{true}.

As shown, the VcdOrg entity 404 itself along with VcdOrgById query 406 (which loads an instance of the entity by a given ID) are target subjects with OLTP requirements described by the associated OLTP PSLA 210-1, while the VcdOrgCountByRegion query 408 may be deemed as an analytical subject with OLAP requirements and a target subject for a separate OLAP PSLA 210-2. The subject information in persistence contract 216 enables vDB runtime 112 to determine the PSLA(s) to enforce according to the context of the persistence command.

A given PSLA can depend on another PSLA to reflect a pattern's hierarchy. For example, the OLAP PSLA 210-2 is depicted with a dependency 410 on OLTP PSLA 210-1 to represent that in order for the OLAP PSLA to be enforced, the OLTP PSLA must be enforced first to collect data for the analysis.

In one embodiment, for each detected PSLA 210, compiler module 134 uses pre-configured instruction generators to generate an ordered virtual instruction set 212 that constitutes a plan for enforcing the respective PSLA during persistence and retrieval operations. The set of PSLA instructions 212 represents a set of virtual instructions that specifies what persistence operations need to be performed (as opposed to how persistence operation should be performed). PSLA instructions 212, referred to interchangeably herein as virtual instructions, enable portability across systems with different underlying persistence stores. In one embodiment, there may be one or more pre-defined virtual instruction sets 212 that may be retrieved based on the type of PSLA (e.g., OLTP, OLAP).

For example, an instruction set may be generated for an OLTP PSLA which handles all entity create, read, update, and delete (i.e., CRUD) persistence requests. In this example, the instruction set includes a CRUD instruction 212-1 which does not specifically say how to create, read update, delete, but rather, specifies that to satisfy the OLTP PSLA, a particular persistent store needs to support CRUD persistence commands. The OLTP PSLA instruction set may further include a Log instruction (not shown) that instructs vDB runtime 112 to do write-ahead logging (WAL) for cross-store durability, as described later.

In another example, for an OLAP PSLA 210-2, an instruction set may be generated containing an ETL instruction 212-2 for taking data from one subject and transforming it for use by another subject. The ETL instruction may be associated with an entity-registration command (in the case of a pull ETL) or with the CRUD commands (in case of a push ETL). The ETL instruction 212-2 handles requests to extract changed source data (e.g., from OLTP or OLAP stores), transform the data in de-normalized form (and possibly joining data from other entities), and loads the result in a target OLAP store. Further, a Retrieve instruction 212-3 may be generated which handles query requests, for example in the context of an OLAP store, by applying requested aggregations, usually for replicated and/or de-normalized data. It should be recognized that other additional instructions may be added to cover persistence automata extensions and new use cases.

In the example shown in FIG. 4, the virtual instruction set for OLTP PSLA 210-1 includes a CRUD instruction 212-1, and the instruction set for OLAP PSLA 210-2 includes an ETL instruction 212-2 followed by a Retrieve instruction 212-3.

According to one embodiment, a virtual instruction associated with a subject or persistent store may be chained to pre-required or post-required subjects or stores, thereby forming a data flow. For example, the ETL instruction of an analytical query PSLA may have a "delta" query as a pre-required subject and an "entity replica" as a post-required subject. The delta query has a single Retrieve instruction in its PSLA, and the replica entity has a CRUD instruction in its OLTP PSLA. Thus, in this example, the ETL instruction encodes a data flow through the sequence of extract entity deltas transform and load into the entity replica. In one embodiment, the virtual instruction set associated with a PSLA may be ordered, such that the order represents a sequence of actions for enforcing the PSLA during persistence and retrieval operations. For example, an ETL instruction for an analytical query PSLA precedes the Retrieve instruction, as query data needs first to be prepared.

According to one embodiment, compiler module 134 may generate new system entities and new system queries that can act as intermediaries within data flows between different stores, and insert new PSLA instructions to link these system entities and queries with existing entities and queries. These new entities and queries may be used for resolving conflicts between persistence requirements and other functionality. In one embodiment, compiler module 134 may create a system entity referred to as a "delta entity" that describes changes to a target entity, such as old and new values of a changed entity property. A delta entity can feed an ETL process with changed data, for example, using chained instructions and chained pre- and post-required subjects. A delta entity may be used in data flows with ETL operations to combine store capabilities and achieve functionality not supported by a single persistence store. Entities having a "resilience" persistence requirement is one example of a single persistence store (e.g., in-memory database) being unable to cope with persistence requirements of being in a durable (resilient) store. Queries having conflicting PSLAs (i.e., OLAP-OLTP conflict) represent another example of a single persistence store being unable to cope with persistence requirements of both OLAP and OLAP. As such, through ETL operations and delta entities, vDB runtime 112 employs a second OLAP specialized store and offloads the OLTP store.

For example, using the entity from Table 1, compiler module 134 may detect a PSLA conflict based on the OLAP PSLA 210-2 associated with the analytical query not being within the entity OLTP PSLA 210-1. In order to resolve such an OLTP-OLAP PSLA conflict, compiler module 134 may insert a Log instruction at a first position of the entity PSLA instruction plan, create a new delta entity VcdOrgDelta to track changes to the VcdOrg entity, and create a query VcdOrgDeltaQuery (e.g., via @Query annotation over the VcdOrgDelta entity) to retrieve the delta changes. Compiler module 134 may then create a new entity VcdOrgReplica that acts as a replica of the VcdOrg entity. Then, compiler module 134 chains the ETL query instruction to the VcdOrgDeltaQuery subject as a pre-required subject and to the VcdOrgReplica subject as a post-required subject, thereby allowing the data for the heavy volume VcdOrg-CountByRegion query to be extracted and pre-computed.

In one embodiment, persistence contract 216 further defines entry point(s), also referred to as triggers, for the PSLA instruction plan. Each instruction may be associated with one or more entry points. Entry points represent the persistence commands that are supported by the persistence framework 122, i.e., the commands the developer vDB user can issue on the subject store. For example, as shown in FIG. 4, the CRUD instruction 212-1 may be associated with create, read (by ID), update, and delete commands. The ETL instruction 212-2 may be associated with a query initialization command (e.g., Initialize) in cases of periodic scheduled ETL pull, and with a Execute Query command in case of on-demand ETL. The Retrieve instruction may be associated with an Execute Query command. A given entry point refers to the first PSLA instruction that needs to be applied in order to enforce the PSLA of the persistence command's subject. For example, if the Execute Query command points to the Retrieve instruction of the query's PSLA, the ETL instruction is skipped, inferring that the ETL has been scheduled and already handled earlier at query compilation time.

As described above, the information for a subject or store with its associated PSLA, and PSLA properties and instructions are packaged into persistence contracts 216. For example, the compilation artifacts are serialized as a persistence contract, one for each subject, including for those queries and entities generated by compiler module 134. In one particular implementation, any entities generated by compiler module 134 (i.e., VcdOrgDelta and VcdOrgReplica) are serialized as Java class, and any queries generated by compiler module 134 is serialized as a @Query annotation with the VcdOrgDelta Java class. The query-to-entity relations, subjects-to-PSLA associations, PSLA properties and instructions may be serialized in contract manifest files. Persistence contracts 216 accompany the application, and at time of the application's deployment, are registered in the metadata registry 110.

Persistence Store Orchestration

Figure 5:
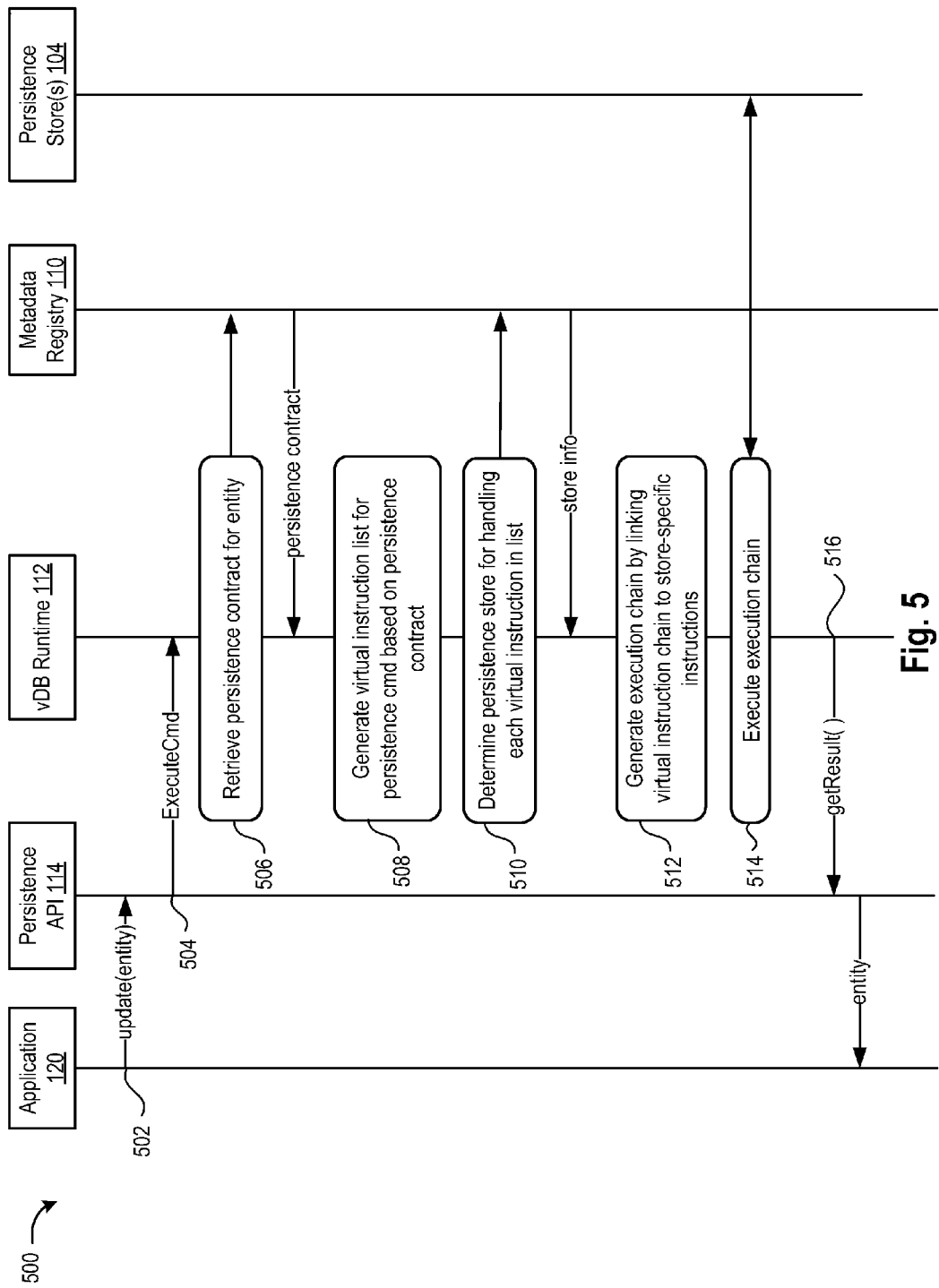
FIG. 5 is a sequence diagram that illustrates steps of a method for executing a persistence command by a virtual persistence platform, according to one embodiment of the disclosure.

According to one embodiment, vDB runtime 112 is responsible for orchestrating the registered persistence stores in order to persist entity data and retrieve query data according to their PSLA and the PSLA(s) associated with the persistence store. FIG. 5 is a sequence diagram that illustrates a method 500 for executing a persistence command by a virtual persistence platform, according to one embodiment of the present disclosure. It should be recognized that, even though the method 500 is described in conjunction with the system of FIG. 1, any system configured to perform the method steps is within the scope of embodiments of the disclosure.

The method 500 begins at step 502, where application 120 issues a persistence request targeting a subject (e.g., entity, query) having pre-determined persistence requirements, through persistence API 114. For example, application 120 may issue a request to update an entity using a call to persistence framework 122, e.g., vdbPersistenceManager.update(myVcdOrg), which in turn, invokes persistence API 114 of vDB node 106. At step 504, upon receiving the entity persistence command, persistence API relays a corresponding persistence command to vDB runtime 112. At step 506, vDB runtime 112 retrieves a persistence contract associated with a subject of the persistence command from metadata registry 110. For example, upon receiving an update command to the VcdOrg entity, vDB runtime 112 retrieves the persistence contract attached to the VcdOrg entity from the metadata registry and extracts the PSLA 210-1 packaged therein.

At step 508, vDB runtime 112 generates a virtual instruction list for the persistence command based on retrieved persistence contract. At step 510, vDB runtime 112 determines a persistence store for handling each virtual instruction in list based on the retrieved persistence contract. In one embodiment, vDB runtime 112 searches among persistence stores registered in metadata registry 110 for a persistence store having persistence characteristics (as embodied by its PSLA) that satisfies the persistence requirements of the persistence command subject (as embodied by its PSLA). At step 512, vDB runtime 112 generates an execution chain by linking the virtual instruction chain to store-specific instructions. In one embodiment, vDB runtime 112 translates the PSLA's virtual instructions to store-specific instructions by assigning one or more store-specific processors to handle a corresponding virtual instruction. In a way, this process may be analogous to applying binary instruction translation, or linking, for computer hardware instructions. At step 514, vDB runtime 112 executes the execution chain with one or more selected persistence stores 104, and returns the results at step 516.

Figure 6:
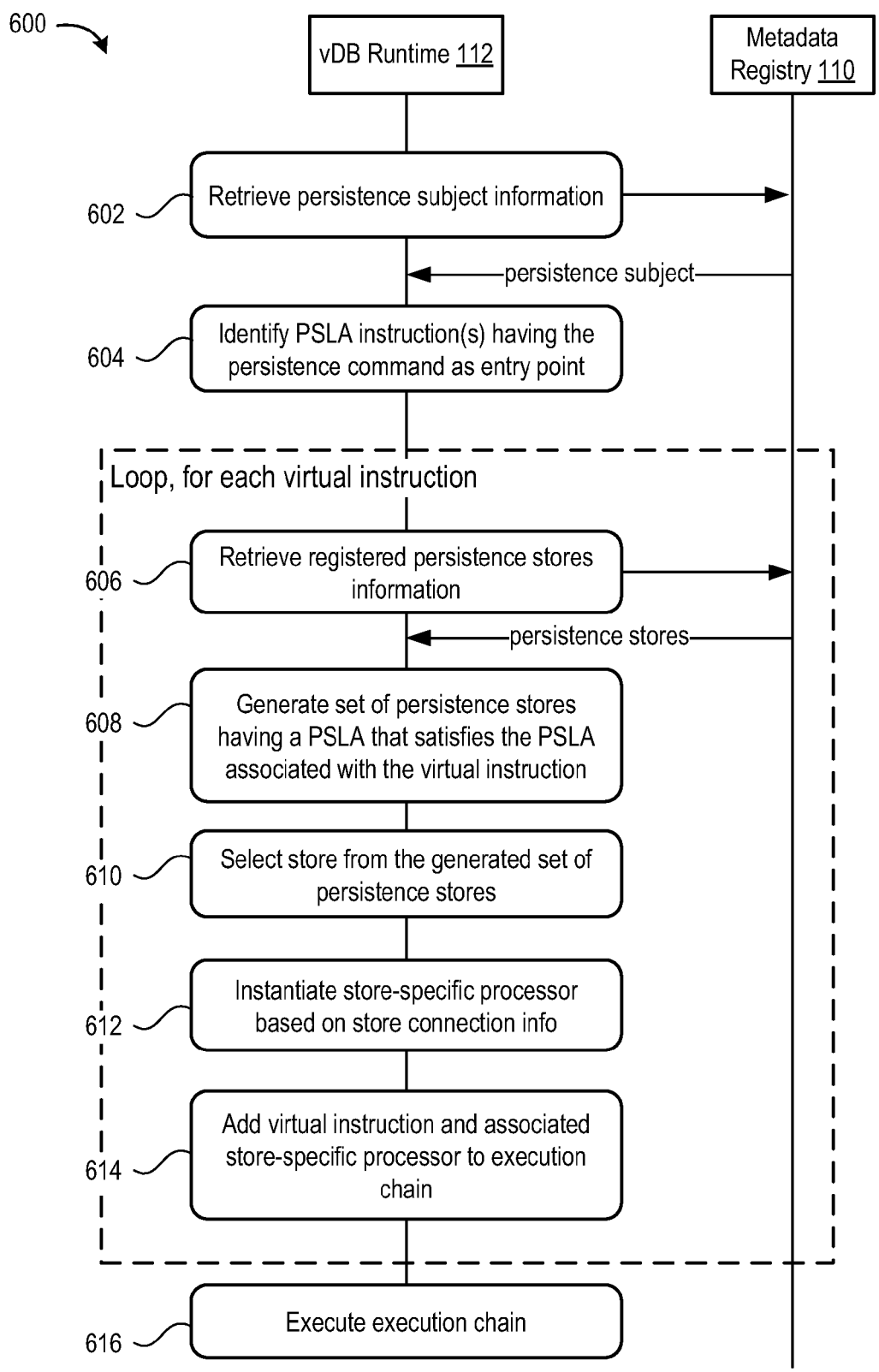
FIG. 6 is a sequence diagram that illustrates steps for a method for translating virtual instructions from a persistence service level agreement to store-specific instructions, according to an embodiment of the present disclosure.

FIG. 6 is a sequence diagram that illustrates a method 600 for translating virtual instructions from a PSLA to store-specific instructions to be executed by store-specific instruction processors, according to one embodiment of the present disclosure. It should be recognized that the steps of method 600 may correspond to steps 506 to 514 of FIG. 5.

At step 602, responsive to a persistence command, vDB runtime 112 retrieves information associated with the subject of the persistence command from metadata registry 110. The retrieved information includes one or more PSLAs associated with the subject, each PSLA having one or more virtual instructions (as depicted in FIG. 4). At step 604, vDB runtime 112 determines the PSLA instructions associated with the subject and the command (the instructions entry-point). For example, vDB runtime 112 finds the virtual instruction within the subject's PSLA that has the "update" command as an entry point. Using the example of FIG. 4, vDB runtime 112 determines the CRUD instruction 212-1 has such an "update" entry point.

In one embodiment, vDB node generates an instruction execution chain for carrying out the persistence command over the subject in a way that honors the persistence contract. For example, vDB runtime 112 creates an instruction execution chain for carrying out the "update" command over the subject entity in a way that satisfies the associated PSLA 210-1.

For each virtual instruction in the PSLA associated with the subject, at step 606, vDB runtime 112 retrieves a list of registered persistence stores 104 (e.g., as registered by persistence provider 102 using SPI 108) from metadata registry 110. At step 608, vDB runtime 112 determines a set of persistence stores for handling an instruction based on a comparison between the instruction's PSLA and each store's PSLA. In one embodiment, for each registered persistence store, vDB runtime 112 determines whether a given persistence store has a PSLA that satisfies the PSLA associated with the given PSLA instruction. That is, vDB runtime 112 identifies persistence stores for handling the persistence command such that the subject's PSLA "is within" each store's PSLA. At step 610, vDB runtime 112 selects a "most suitable" persistence store from the generated set of persistence stores using a domain choosing strategy.

Using the example VcdOrg entity described above, vDB runtime 112 may retrieve a PSLA associated with a key-value store (e.g., Redis) that specifies a scalable OLTP-type of persistence store that is capable of fulfilling the OLTP PSLA associated with VcdOrg entity. vDB runtime 112 may further retrieve a second PSLA associated with a relational database system (e.g., Oracle) which specifies another OLTP-type of persistence store, but lacks an indication of support for partition tolerance, a persistence property required by the VcdOrg entity PSLA. As such, in this example, vDB runtime 112 determines that the registered key-value store is the persistence store best matching the entity PSLA.

At step 612, vDB runtime 112 instantiates a store-specific processor based on the store connection information (e.g., loaded from metadata registry 110) to handle each virtual instruction. At step 614, vDB runtime 112 adds the virtual instruction and associated store-specific processor to an execution chain. In one embodiment, vDB runtime 112 translates virtual instructions by associating a store-specific instruction processor for each virtual instruction specified by the subject's PSLA. Each store-specific instruction processor is configured to translate a given virtual instruction to store-specific commands. For example, after selecting a key-value persistence store (e.g., Redis), vDB runtime instantiates a Redis-specific instruction processor to handle an update to the VcdOrg entity. The Redis-specific instruction processor is a CRUD instruction processor configured to, in response to an "update" persistence command, apply a series of "SET" Redis statements for each changed entity property.

In one embodiment, vDB runtime 112 may load store-specific instruction processors according to a configurable mapping, to provide flexibility over instruction interpretation (i.e., the "how" aspect of persistence). For example, by supplying an additional instruction processor, the execution strategy for a Retrieve instruction can be changed from a type-safe query processing that loads a graph of entity instances to a more efficient processing where analytical queries operate on concise sets. It should be recognized that the translation and execution of virtual instructions may be optimized according to known techniques for computer instruction processing, including pre-translation, parallel execution, branch prediction, etc. For example, in some embodiments, vDB runtime 112 may cache generated execution chains within metadata registry 110 for later repeated use.

At step 616, after the virtual instructions associated with the PSLA have been linked to execution processors, vDB runtime 112 executes the generated execution chain. In one embodiment, a plan executor of vDB runtime 112 handles each virtual instruction by invoking the associated store-specific instruction processor, thereby fulfilling the persistence command according to developer-specified persistence requirements and the capabilities of the registered stores. The plan executor maintains an execution context to facilitate data exchange between store-specific processors. For example, plan executor can maintain an execution context to handle data loaded by one instruction processor to be used by another instruction processor.

It should be recognized that while FIG. 5 illustrates steps for executing a CRUD persistence command (e.g., entity update), other persistence and retrieval commands may be handled according to techniques described herein, such as data retrieval using OLAP and OLTP queries. In one example involving an OLTP query, application 120 issues a query request for a query that processes a small volume of data and is subject to an OLTP PSLA, such as the VcdOrg-ById shown in Table 1. In one implementation, application 120 may issue the query request using persistence framework 122 (e.g., myVcdOrgByIdQuery.execute( ). Upon receiving the query request, vDB runtime 112 loads information for the VcdOrgById subject and its associated OLTP PSLA 210-1. vDB runtime 112 determines that the virtual instruction plan associated with OLTP PSLA 210-1 includes a Retrieve instruction which has an "execute query" entry point. Similar to the example CRUD operation described above, vDB runtime 112 determines a suitable persistence store that satisfies the OLTP PSLA 210-1 associated with the VcdOrgById subject, in this case, a key-value store (e.g., Redis). vDB runtime 112 links a Redis-specific instruction processor to the Retrieve instruction. During execution of the execution chain, the Redis-specific instruction processor applies a series of GET statements to retrieve VcdOrg data from the Redis store, and the retrieved query data is returned to application 120.

Another example of handling a query request involves an OLAP query. In one embodiment, an application may have specified a query that processes a large volume of data, aggregates it, and returns fewer rows, such as the VcdOrg-CountByRegion shown in Table 1. Further, this query inherits a partition tolerance persistence requirement from its linked entity VcdOrg, which indicates the query can be issued by any user in a distributed system. As such, this type of query may be a candidate for an OLAP PSLA, and its handling is described in conjunction with FIG. 7.

Figure 7:
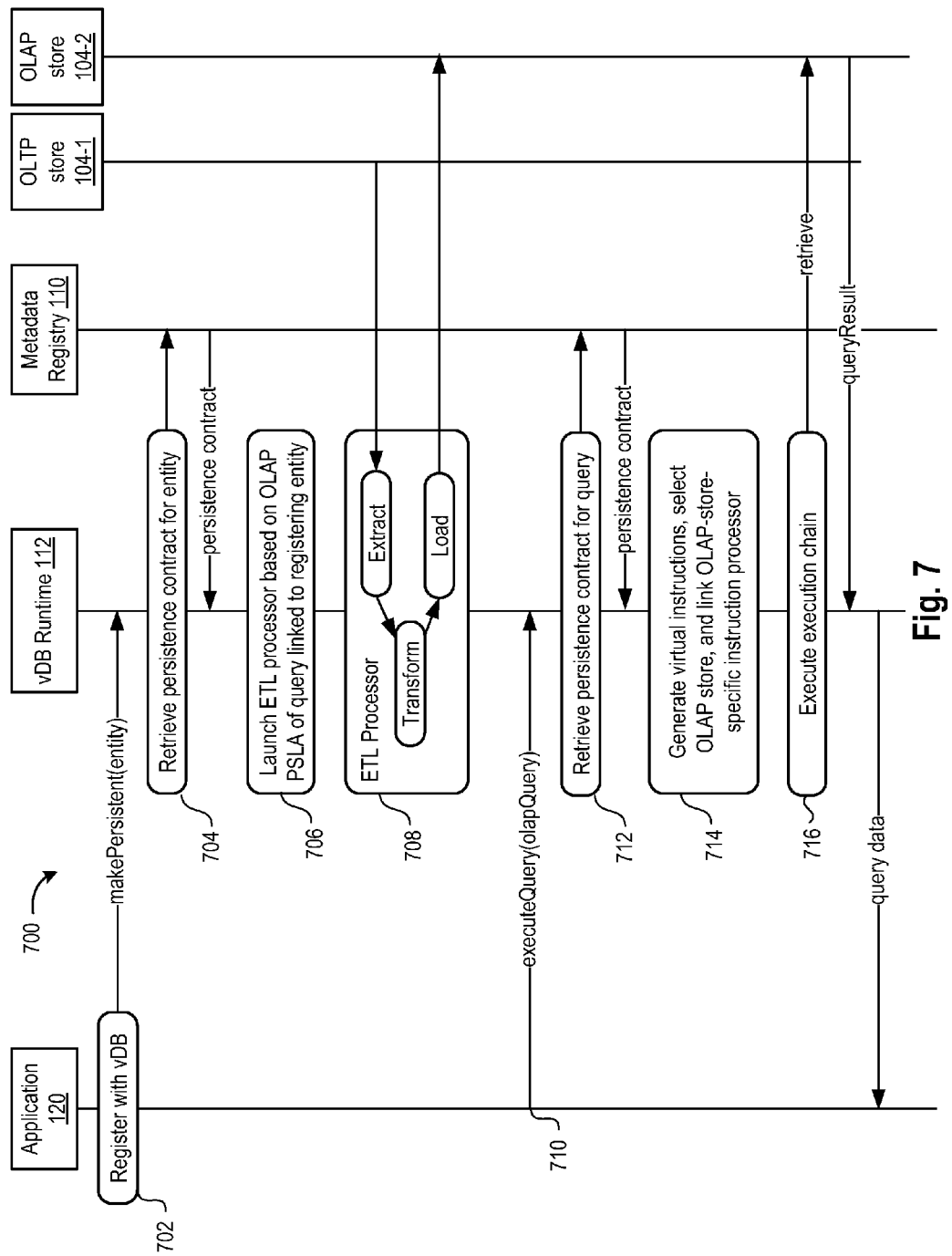
FIG. 7 is a sequence diagram that illustrates steps of a method for executing a data retrieval command by a virtual persistence platform, according to one embodiment of the disclosure.

FIG. 7 is a sequence diagram that illustrates a method 700 for executing a retrieval command by a virtual persistence platform, according to one embodiment of the present disclosure. It should be recognized that, even though the method 700 is described in conjunction with the system of FIG. 1, any system configured to perform the method steps is within the scope of embodiments of the disclosure. The method begins at step 702, where an application registers an entity with vDB node 106 through persistence API 114. In one implementation, application 120 uses persistent framework 122 to mark an object as persistable, e.g., PersistentManager.makePersistent(entity), which in turns invokes a call to persistence API 114 to register the entity. Persistence API 114 has been omitted from FIG. 7 for clarity of illustration.

Upon receiving the registration request, at step 704, vDB runtime 112 may retrieve a persistence contract associated with the registering entity and/or related queries. In one embodiment, vDB runtime 112 processes the PSLA(s) associated with the registering entity and PSLAs associated with queries linked to the entity, if any, to determine if ETL operations should be scheduled to satisfy the PSLAs. If so, at step 706, vDB runtime 112 launches an ETL processor based on the OLAP PSLA for a query linked to the registering entity. In the VcdOrg entity example, vDB runtime 112 identifies the VcdOrgCountByRegion query linked to the registering entity has an OLAP PSLA having a persistence requirement for latency (i.e., "2 min"). To satisfy the latency requirement (i.e., "2 min") specified for the VcdOrg-CountByRegion query, vDB runtime 112 schedules a background ETL process which periodically denormalizes data for the OLAP query. In one particular embodiment, the logic to pre-launch an ETL processor may be encoded in the virtual ETL instruction within OLAP PSLA for the query. The ETL instruction may have an entry point for a query initialization command or entity registration command (e.g., Initialize) that is triggered whenever the entity (or query) is registered, as in the example PSLA 210-1 in FIG. 4. As described earlier, in one embodiment, the PSLAs associated with conflicting OLTP-OLAP queries include an instruction plan (e.g. generated by compiler module 134) having an ETL query instruction chained to a VcdOrgDeltaQuery subject (which retrieves changes from a delta entity VcdOrgDelta that track changes to the VcdOrg entity) as a pre-required subject and to a VcdOrgReplic a entity (that acts as a replica of VcdOrg entity) as a post-required subject.

At step 708, the launched ETL processor acts in the background, periodically extracting data from OLTP store 104-1 where the registered entity is being persisted, transforming the data, and loading the data for the query in a second persistence store, OLAP store 104-2. In one embodiment, vDB runtime 112 selects a persistence store for loading the transformed data according to the persistence requirements of OLAP PSLA 210-2 for the requested query. In the example of the VcdOrgCountByRegion query, vDB runtime 112 selects a persistence store that is partition-tolerant (distributed) and is capable of processing large volumes of data, such as a Map-Reduce-type of persistence store (e.g., Hadoop with Hive). As per the instruction plan for the ETL instruction, vDB runtime 112 extracts data (e.g., via VcdOrgDeltaQuery) from OLTP store 104-1, transforms the extracted data, and loads the transformed data into a VcdOrgReplica entity persisted in OLAP store 104-2.

Meanwhile, at some time subsequent, at step 710, application 120 may issue a query request to vDB runtime 112 to execute an analytical query VcdOrgCountByRegion. Upon receiving the query request command (e.g., via persistence API 114), the vDB runtime identifies the VcdOrgCountByRegion query as the subject of the command and retrieves the associated OLAP PSLA from metadata registry 110, at step 712. The retrieved OLAP PSLA 210-2 includes an ETL instruction and a Retrieve instruction. As described earlier, a given entry point refers to the first virtual instruction that needs to be applied in order to enforce the PSLA of the persistence command's subject. In this case, processing of the ETL instruction has already been started at the time the application was deployed and the persistence contract associated with the OLAP query was registered with metadata registry 110. As such, the entry point for the "execute query" command is associated with the Retrieve instruction of the query's PSLA, and the ETL instruction is skipped, based on the inference that the ETL has been scheduled and already handled earlier at query creation time (e.g., at step 702).

At step 714, in operations similar to the CRUD persistence and OLTP query operations described above, vDB runtime 112 generates a virtual instruction list having the Retrieve instruction based on the "execute query" entry point, selects a suitable persistence store based on the OLAP PSLA, and links an OLAP store-specific instruction processor to the virtual instruction Retrieve. It should be recognized that the persistence store selected at step 714 may be the same store selected and loaded with data during ETL operations at step 708. At step 716, vDB runtime 112 executes the execution chain by invoking the OLAP-specific instruction process linked to the Retrieve instruction, retrieving query data from OLAP store 104-2, and returning the query data back to application 120.

Accordingly, this "replication" strategy for handling analytical queries enables the vDB runtime to translate virtual retrieval instructions for an analytical query to OLAP-type store that can process large amounts of data, while an ETL instruction of the query PSLA preliminarily delivers the denormalized data. In another embodiment, this replication strategy may further be applied to functional requirements, e.g., the de-normalization target store is determined according to a language dialect of the query. An example of function requirements defined for an entity is shown in Table 2 below. The VcdOrg entity of Table 2 is similar to the VcdOrg entity shown in Table 1, functional requirements notwithstanding. For sake of clarity, contents of the VcdOrg entity have been omitted.

TABLE 2

Example of functional requirements

```
@PersistenceCapable
@Extensions({
    @Extension(vendorName = "vdb", key="volume", value="L"),
    @Extension(vendorName = "vdb", key "partition", value="true")
})
@Queries( {
    @Query(name="VcdOrgById",
        value="SELECT FROM vdb.example.org.VcdOrg WHERE id = ?",
        extensions={
            @Extension(vendorName="vdb", key="volume", value="S"),
            @Extension(vendorName="vdb", key="dialect", value=
            "OQL") }),
    @Query(name="GroupByRegion",
        value="GROUP VcdOrgById BY region",
        extensions={
            @Extension(vendorName="vdb", key="volume", value="L"),
            @Extension(vendorName="vdb", key="dialect", value="PIG") }),
    @Query(name="VcdOrgCountByRegion",
        value="FOREACH GroupByRegion GENERATE
COUNT(VcdOrgById) as count, group as region",
        extensions={
            @Extension(vendorName="vdb", key="volume", value="L"),
            @Extension(vendorName="vdb", key="dialect", value="PIG") })
})
public class VcdOrg {
    ...
}
```

Table 2 illustrates example application code that defines queries over an entity, which then reference other named queries, thereby describing more complex data-flows. Queries can pose functional and non-functional requirements. In the example shown, a simple VcdOrgById query uses OQL (Object Query Language) to load an entity by a given ID. An analytical query GroupByRegion is defined to group VcdOrg entities returned from the simple VcdOrgById query, is annotated with a persistence requirement for large volumes of processed data (e.g., volume="L"), and is defined with the Map-Reduce language of "Pig". VcdOrgCountByRegion is an analytical reducing query also defined with the Map-Reduce language of "Pig".

According to one embodiment, vDB runtime 112 replicates data for an entity (in a "source" persistence store) to a target persistence store for use by a query according to the language dialect of the query as specified by the persistence requirements (e.g., dialect="PIG"). In the example shown in Table 2, the GroupByRegion and VcdOrgCountByRegion queries, which are specified as Map-Reduce "Pig" queries, will result in replication to a Hadoop-enabled persistence store, while an SQL analytical query may result in replication to a RDBMS store. When processing a data retrieval command for the GroupByRegion and VcdOrgCountByRegion queries, the vDB runtime may identify that PSLAs associated with queries GroupByRegion and VcdOrgCountByRegion include persistence requirements that specify the Pig language. The vDB runtime may then select a Hadoop-enabled persistence store as the target of the ETL instruction for fulfilling data retrieval command. Note that by referencing named queries within other named queries, the target store of one ETL instruction may be the source of another, allowing the implementation of data-flow schemes. This orchestration strategy enables the "store once, view in multiple ways" virtual persistence paradigm.

Embodiments of the present disclosure provide a strategy for partitioning entities when performing store orchestration that fulfills the specified persistence requirements. As described earlier, the vDB runtime can map a virtual CRUD instruction to a most suitable store according to a comparison of the PSLA associated with the entity subject to the PSLA associated with the persistence store. In some cases, this may mean that data for entities with different PSLAs are persisted to different stores, even for entities that are part of the same application. In one embodiment, a composite entity can be decomposed by the vDB runtime to its children entities. If the children entities have different PSLAs, the composite entity is effectively partitioned among stores.

Similarly, embodiments of present disclosure provide a strategy for query federation when performing store orchestration that fulfills the persistence requirements specified for queries. In one embodiment, the vDB runtime may decompose a data retrieval instruction for a composite entity or query into the retrieval instructions of its atomic entities or queries. Then, the vDB runtime routes each sub-instruction against a suitable store, and the query results are joined within the virtual persistence platform and returned to the application. For example, an online store application might store financial information in a highly consistent store such as a RDBMS and store inventory information in a flexible store such as a document-oriented database (e.g., MongoDB). To generate a sales report that needs data from the two data sources to show the income grouped by inventory items, the vDB runtime automates and facilitates that task by easily joining the result sets from the relevant stores. These orchestration strategies advantageously solves the polyglot persistence problem since a developer may leverage different types of stores, each with their respective advantages and benefits, to fulfill a wide range of persistence needs, without having to gain expertise in every type of store.

According to one embodiment, vDB runtime 112 may apply a partitioning strategy when performing store orchestration that fulfills specified persistence requirements. As described earlier, the vDB runtime can map a virtual CRUD instruction to a most suitable store according to a comparison of the PSLA associated with the entity or query subject to the PSLA associated with the persistence store. In some cases, this may mean that data for entities with different PSLAs are persisted to different stores, and data of queries having different PSLAs may be retrieved from different persistence stores, even for entities and queries that are part of the same application. In one embodiment, a composite entity or query can be decomposed by the vDB runtime to its children entities and queries. If the children entities and queries have different PSLAs, the composite entity or query is effectively partitioned among stores. This orchestration strategy advantageously solves the polyglot persistence problem since a developer may leverage different types of stores, each with their respective advantages and benefits, to fulfill a wide range of persistence needs, without having to gain expertise in every type of store.

Persistence with Delta Log

According to one embodiment, some entities may have persistence requirement for "resilience", such that these entities are stored in a durable way to be available for recovery even in case of a complete store failure or logical error. In one implementation, a developer may mark these entities with a persistence property (i.e., resilience="true") using code annotations in application code as described above. This feature may be useful for "global" entities with persistence requirements for high availability and partition tolerance, since these entities are often stored in in-memory stores that lack fault-tolerance in case of failure of a complete cluster of memory nodes. This feature may also be advantageous for entities prone to logical errors, such as operator errors or application bugs.

In one embodiment, when processing a particular entity and generating an OLTP PSLA and virtual instruction set associated with the PSLA, a compiler module 134 may detect a persistence requirement for resilience has been specified for the particular entity. In response to the resilience requirement, compiler module 134 may generate a Log instruction to be included as part of the virtual instruction set associated with the entity's OLTP PSLA. The compiler module then creates a new Delta entity, which is a system-generated entity that describes changes to the particular entity (e.g., old and new values for changed entity properties). In one embodiment, the new Delta entity may be created with persistence requirements that specify a large number of writes, entity immutability, a certain data retention period, and durability (i.e., which requires a candidate persistence store to materialize the delta entities as soon as possible). The compiler module chains the particular entity's CRUD instruction to the new Delta entity. In one embodiment, the compiler module may chain the CRUD instruction to the Delta entity as a pre-required subject, thereby forming a Write-Ahead-Log (WAL). In another embodiment, the compiler module may chain the CRUD instruction to the Delta entity as a post-required subject, thereby forming a Write-Behind-Log.

In operation, when handling a CRUD persistence operation, the vDB runtime also executes the Log instruction that has been inserted as part of the virtual instruction set associated with the entity's OLTP PSLA. In one embodiment, to handle the Log instruction, the vDB runtime uses a Log instruction processor, which creates and persists the Delta entities in relation to the OLTP CRUD instruction. The vDB runtime selects a suitable store for persisting the Delta entities based on the PSLA for the Delta entity (which specifies requirements of large number of writes, immutability, a data retention period, and durability), as per the techniques described herein. In one embodiment, vDB runtime may also enforce a requirement to select a persistence store for the Delta entity that is different than primary store for the original particular entity, thereby fulfilling the resilience requirement. For example, vDB runtime may determine that a RDBMS store has mature backup and recovery capabilities and is suitable candidate for a delta store. In one embodiment, the delta log may be used for logical backup and recovery in case of failure of the entire primary entity store. In one embodiment, a delta log query may be generated and used a pre-required subject for an OLAP ETL instruction.

Accordingly, embodiments of the present disclosure provide a requirement-driven virtual persistence layer that can support a wide variety of persistence stores. In contrast to conventional approaches, embodiments described herein advantageously abstract complexities in different database APIs, thereby allowing developers to focus on core functionality, reduces back-end development time and maintenance costs, and eliminates subject factor of choice in persistence technologies. Furthermore, embodiments described herein provide persistence store orchestration strategies that can overcome typical persistence limitations, such as the limitations of Consistency, Availability, and Partition-tolerance as posed by the CAP theorem.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present disclosure may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for providing a persistence layer to an application, the method comprising:

receiving, from the application, an entity-level persistence command for an entity of the application, the entity comprising an object of the application that can be persisted;

retrieving metadata associated with the entity, wherein the metadata specifies a set of persistence requirements associated with the entity, a virtual instruction set, and an entry point to a virtual instruction in the virtual instruction set associated with the received entity-level persistence command, the persistence requirements including a volume of processed data, a partition tolerance, or a latency;

selecting a database system from a plurality of candidate database systems based on the set of persistence requirements associated with the entity and persistence capabilities associated with the candidate database systems;

linking the virtual instruction to an instruction processor specific to the selected database system; and executing the received entity-level persistence command by invoking the linked instruction processor to translate the virtual instruction to one or more database-specific commands and apply the one or more database-specific commands to the selected database system.

2. The method of claim 1, wherein the set of persistence requirements associated with the entity of the application is generated by:

parsing annotations within program code for the application to extract one or more persistence properties; and generating a persistence service level agreement (PSLA) using an automata based on the extracted persistence properties, the PSLA specifying the set of persistence requirements associated with the entity of the application.

3. The method of claim 1, wherein the set of persistence requirements associated with the entity of the application is generated by:

determining one or more persistence properties based on a class interface within program code for the entity of the application; and generating a persistence service level agreement (PSLA) using an automata based on the determined persistence properties, the PSLA specifying the set of persistence requirements associated with the entity of the application.

4. The method of claim 1, wherein the persistence capabilities associated with the candidate persistence stores are registered in a metadata registry.

5. The method of claim 1, wherein the entity-level persistence command includes a data retrieval command for a query defined over the entity of the application.

6. The method of claim 5, wherein:

the set of persistence requirements associated with entity for the application conflict with a set of persistence requirements associated with the query defined over the entity; and retrieved metadata for the query includes an ordered virtual instruction chain comprising a system-generated delta query, an Extract-Transform-Load virtual instruction, and a system-generated replica entity.

7. The method of claim 1, further comprising:

decomposing the entity for the application into a first child entity having a first set of persistence requirements and a second child entity having a second set of persistence requirements, wherein the first and second sets of persistence requirements are different;

selecting a first persistence store for the first child entity based on the first set of persistence requirements;

selecting a second persistence store for the second child entity based on the second set of persistence requirements; and executing the received entity-level persistence command using linked instruction processors specific to each of the first and second persistence stores.

8. The method of claim 1, wherein the candidate database systems comprises two of more of a relational database system, a non-relational big-table distributed database system, a document-oriented database system, a key-value database system, and a graph database system.

9. A method for providing a persistence layer to an application, the method comprising:

receiving a command to register an entity of the application;

retrieving metadata associated with the entity and metadata associated with a query linked to the entity, wherein the metadata associated with the query includes an Extract-Transform-Load (ETL) virtual instruction associated with the received register command;

selecting a first persistence store for persisting the registered entity based on a set of persistence requirements associated with the entity;

selecting a second persistence store for executing the query based on a set of persistence requirements associated with the query;

launching an ETL instruction processor based on the ETL virtual instruction to extract, transform, and load entity data from the first persistence store to the second persistence store;

receiving, from the application, a data retrieval command for the query defined over the entity;

retrieving the metadata associated with the query, wherein the metadata specifies the set of persistence requirements associated with the query and an entry point to a virtual instruction associated with the received data retrieval command;

selecting a persistence store from a plurality of candidate persistence stores based on the set of persistence requirements associated with the query;

linking the virtual instruction to an instruction processor specific to the selected persistence store; and executing the received data retrieval command using the linked instruction processor specific to the selected persistence store.

10. A non-transitory computer readable storage medium having stored thereon program instructions for providing a persistence layer to an application, wherein execution of the program instructions by one or more processes of a computer system causes the one or more processors to carry out the steps of:

receiving, from an application, an entity-level persistence command for an entity of the application, the entity comprising an object of the application that can be persisted;

retrieving metadata associated with the entity, wherein the metadata specifies a set of persistence requirements associated with the entity, a virtual instruction set, and an entry point to a virtual instruction in the virtual instruction set associated with the received entity-level persistence command, the persistence requirement including a volume of processed data, a partition tolerance, or a latency;

selecting a database system from a plurality of candidate database systems based on the set of persistence requirements associated with the entity and persistence capabilities associated with the candidate database systems;

linking the virtual instruction to an instruction processor specific to the selected database system; and executing the received entity-level persistence command by invoking the linked instruction processor to translate the virtual instruction to one or more database-specific commands and apply the one or more database-specific commands to the selected database system.

11. The non-transitory computer readable storage medium of claim 10, wherein the set of persistence requirements associated with the entity of the application is generated by:

parsing annotations within program code for the application to extract one or more persistence properties; and generating a persistence service level agreement (PSLA) using an automata based on the extracted persistence properties, the PSLA specifying the set of persistence requirements associated with the entity of the application.

12. The non-transitory computer readable storage medium of claim 10, wherein the set of persistence requirements associated with the entity of the application is generated by:

determining one or more persistence properties based on a class interface within program code for the entity of the application; and generating a persistence service level agreement (PSLA) using an automata based on the determined persistence properties, the PSLA specifying the set of persistence requirements associated with the entity of the application.

13. The non-transitory computer readable storage medium of claim 10, wherein the persistence capabilities associated with the candidate persistence stores are registered in a metadata registry.

14. The non-transitory computer readable storage medium of claim 10, wherein the entity-level persistence command includes a data retrieval command for a query defined over the entity of the application.

15. The non-transitory computer readable storage medium of claim 14, wherein:

the set of persistence requirements associated with entity for the application conflict with the set of persistence requirements associated with the query defined over the entity; and retrieved metadata for the query includes an ordered virtual instruction chain comprising a system-generated delta query, an Extract-Transform-Load virtual instruction, and a system-generated replica entity.

16. The non-transitory computer readable storage medium of claim 10, further comprising program instructions configured to carry out the steps of:

decomposing the entity for the application into a first child entity having a first set of persistence requirements and a second child entity having a second set of persistence requirements, wherein the first and second sets of persistence requirements are different;

selecting a first persistence store for the first child entity based on the first set of persistence requirements;

selecting a second persistence store for the second child entity based on the second set of persistence requirements; and executing the received entity-level persistence command using linked instruction processors specific to each of the first and second persistence stores.

17. The non-transitory computer readable storage medium of claim 10, wherein the candidate database systems comprises two of more of a relational database system, a non-relational big-table distributed database system, a document-oriented database system, a key-value database system, and a graph database system.

18. A non-transitory computer readable storage medium having stored thereon program instructions for providing a persistence layer to an application, wherein execution of the program instructions by one or more processes of a computer system causes the one or more processors to carry out the steps of:
  receiving a command to register an entity of the application as persistable;
  retrieving metadata associated with the entity and metadata associated with a query linked to the entity, wherein the metadata associated with the query includes an Extract-Transform-Load (ETL) virtual instruction associated with the received register command;
  selecting a first persistence store for persisting the registered entity based on a set of persistence requirements associated with the entity;
  selecting a second persistence store for executing the query based on a set of persistence requirements associated with the query; and
  launching an ETL instruction processor based on the ETL virtual instruction to extract, transform, and load entity data from the first persistence store to the second persistence store
  receiving, from the application, a data retrieval command for the query defined over the entity;
  retrieving the metadata associated with the query, wherein the metadata specifies the set of persistence requirements associated with the query and an entry point to a virtual instruction associated with the received data retrieval command;
  selecting a persistence store from a plurality of candidate persistence stores based on the set of persistence requirements associated with the query;
  linking the virtual instruction to an instruction processor specific to the selected persistence store; and
  executing the received data retrieval command using the linked instruction processor specific to the selected persistence store.

19. A computer system for providing a persistence layer to an application, the computer system comprising:
  a storage device having metadata registered by an application; and
  a processor programmed to carry out the steps of:
    receiving, from the application, an entity-level persistence command for an entity of the application, the entity comprising an object of the application that can be persisted;
    retrieving, from the storage device, metadata associated with the entity, wherein the metadata specifies a set of persistence requirements associated with the entity, a virtual instruction set, and an entry point to a virtual instruction in the virtual instruction set associated with the received entity-level persistence command, the persistence requirements including a volume of processed data, a partition tolerance, or a latency;
    selecting a database system from a plurality of candidate database systems based on the set of persistence requirements associated with the entity and persistence capabilities associated with the candidate database systems;
    linking the virtual instruction to an instruction processor specific to the selected database system; and
    executing the received entity-level persistence command by invoking the linked instruction processor to translate the virtual instruction to one or more database-specific commands and apply the one or more database-specific commands to the selected database system.

20. The computer system of claim 19, wherein the set of persistence requirements associated with the entity of the application is generated by:
  parsing annotations within program code for the application to extract one or more persistence properties; and
  generating a persistence service level agreement (PSLA) using an automata based on the extracted persistence properties, the PSLA specifying the set of persistence requirements associated with the entity of the application.

21. The computer system of claim 19, wherein the set of persistence requirements associated with the entity of the application is generated by:
  determining one or more persistence properties based on a class interface within program code for the entity of the application; and
  generating a persistence service level agreement (PSLA) using an automata based on the determined persistence properties, the PSLA specifying the set of persistence requirements associated with the entity of the application.

22. The computer system of claim 19, wherein the predefined persistence capabilities associated with the candidate persistence stores are registered in a metadata registry.

23. The computer system of claim 19, wherein the entity-level persistence command includes a data retrieval command for a query defined over the entity of the application.

24. The computer system of claim 23, wherein:
  the set of persistence requirements associated with entity for the application conflict with a set of persistence requirements associated with the query defined over the entity; and
  retrieved metadata for the query includes an ordered virtual instruction chain comprising a system-generated delta query, an Extract-Transform-Load virtual instruction, and a system-generated replica entity.

25. The computer system of claim 19, wherein the processor is further programmed to carry out the steps of:
  decomposing the entity for the application into a first child entity having a first set of persistence requirements and a second child entity having a second set of persistence requirements, wherein the first and second sets of persistence requirements are different;
  selecting a first persistence store for the first child entity based on the first set of persistence requirements;
  selecting a second persistence store for the second child entity based on the second set of persistence requirements; and
  executing the received entity-level persistence command using linked instruction processors specific to each of the first and second persistence stores.

26. The computer system of claim 19, wherein the candidate database systems comprises two of more of a relational database system, a non-relational big-table distributed database system, a document-oriented database system, a key-value database system, and a graph database system.

27. A computer system for providing a persistence layer to an application, the computer system comprising:
   a storage device having metadata registered by an application; and
   a processor programmed to carry out the steps of:
      receiving a command to register the entity of the application as persistable;
      retrieving metadata associated with the entity, wherein the metadata includes an Extract-Transform-Load (ETL) virtual instruction associated with the received register command;
      selecting a first persistence store for persisting the registered entity based on the set of persistence requirements associated with the entity;
      selecting a second persistence store for executing the query based on a set of persistence requirements associated with the query;
      launching an ETL instruction processor based on the ETL virtual instruction to extract, transform, and load entity data from the first persistence store to the second persistence store;
      receiving, from the application, a data retrieval command for the query defined over the entity;
      retrieving, from the storage device, the metadata associated with the query, wherein the metadata specifies the set of persistence requirements associated with the query and an entry point to a virtual instruction associated with the received data retrieval command;
      selecting a persistence store from a plurality of candidate persistence stores based on the set of persistence requirements associated with the query;
      linking the virtual instruction to an instruction processor specific to the selected persistence store; and
      executing the received data retrieval command using the linked instruction processor specific to the selected persistence store.

* * * * *